United States Patent
Butler

(10) Patent No.: US 7,516,045 B2
(45) Date of Patent: Apr. 7, 2009

(54) METHOD OF PROVIDING CONTENT TO A TARGET DEVICE IN A NETWORK

(75) Inventor: Mark Henry Butler, Bedminster (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 7 days.

(21) Appl. No.: 10/960,581

(22) Filed: Oct. 8, 2004

(65) Prior Publication Data
US 2005/0096870 A1    May 5, 2005

(30) Foreign Application Priority Data
Oct. 31, 2003    (GB)    ................... 0325481.0

(51) Int. Cl.
*G21C 17/00*    (2006.01)
(52) U.S. Cl. .................. 702/183; 705/7; 707/103 R; 709/246; 713/165
(58) Field of Classification Search .............. 702/183, 702/185, 122; 707/103 R, 103 X, 103 Y, 707/103 Z, 104.1; 713/165; 709/221, 246, 709/227; 705/7
See application file for complete search history.

(56) References Cited

U.S. PATENT DOCUMENTS

| 6,122,639 | A  | * | 9/2000 | Babu et al. ............... 707/103 R |
| 6,393,471 | B1 | * | 5/2002 | Kobata ....................... 709/221 |
| 2002/0120684 | A1 | | 8/2002 | Christfort |
| 2003/0167334 | A1 | | 9/2003 | Butler |
| 2004/0064351 | A1 | * | 4/2004 | Mikurak ........................ 705/7 |
| 2004/0172484 | A1 | * | 9/2004 | Hafsteinsson et al. ....... 709/246 |
| 2005/0005109 | A1 | * | 1/2005 | Castaldi et al. ............. 713/165 |

FOREIGN PATENT DOCUMENTS

WO    WO02/44892    A2    6/2002

* cited by examiner

*Primary Examiner*—John H Le

(57) ABSTRACT

A method of enabling a plurality of entities to have sufficient information concerning at least one device and at least one content item, such that each individual entity can arbitrate concerning a performance of said device and said content, on the basis of said device information and said content information.

23 Claims, 10 Drawing Sheets

CAPABILITY CLASSES

IF DISPLAY WIDTH > 90

AND DISPLAY HEIGHT > 90

AND DISPLAY WIDTH <200

AND DISPLAY HEIGHT <320

AND DISPLAY COLOR DEPTH > 8

THEN   MEDIUM SMART PHONE COLOR

} CAPABILITY CLASS

IF MEDIUM SMART PHONE COLOR   THEN

THEN      beckham03.jpg

} MAP FROM CLASS TO CONTENT

Fig. 7

METHOD OF PROVIDING CONTENT TO A TARGET DEVICE IN A NETWORK

FIELD OF THE INVENTION

The present invention relates to a process and apparatus for enabling enterprises to work together to establish systems which operate correctly.

BACKGROUND TO THE INVENTION

In order to use web content or web services on a wide range of target devices, for example personal computers, personal digital assistants, mobile phones, interactive televisions and the like, it is necessary to perform content specialization to match the form of content to the particular device on which it is to appear. As usage of the internet increases, a wider variety of user devices such as mobile telephones, personal computers, personal digital assistants (PDA's), and like devices need to be able to connect to the internet to download content. One significant problem is that different user devices have different input, output software, and network characteristics. For example different devices have different display characteristics. For example, a mobile telephone may have a display screen of dimensions of the order 2 to 9 cm, whereas a PDA device may have a display screen of the order 7×10 cm and other devices such as note book or lap top computers may have larger screens, of the order 22 to 34×22 to 34 cm. The display capabilities of different user devices vary drastically, in terms of picture resolution, color or monochrome capability and audio quality. Even amongst a set of different mobile phones having similar sized screens, capabilities of those phones can vary enormously.

It is currently known that there are two standards used by such devices to describe their capabilities to web servers. Firstly, the CC/PP protocol created by the W3C consortium, and secondly, the UAProf protocol created by the WAP forum. Capability information is used by web servers to perform content specialization, that is to select, adapt or generate suitable content for a target device. With the increasing variety of devices, content does not just refer to standard web pages, but media and program objects such as ring tones or screensavers.

Referring to FIG. 1 herein, there is illustrated schematically a known system for matching content with user devices. Typically, one or more user devices 100 download content over a communications network 101 from a content web server 102. The content web server 102 communicates over a communications network 103 with a device profile web server 104, for the purpose of obtaining a profile of a particular user device. Knowledge of the device profile allows the content web server to serve content to that device in a form suitable for display on that device.

The content web server uses a black box approach using a set of custom rules to make the selected content fit on the requesting user device. However, where the description of the user device obtained from the device manufacturer is inaccurate, the adapted content may not be correctly presentable on the target user device. This relies upon the device implementing the standards correctly, the manufacturer's description of the device being correct and the system used at the content web server correctly matching the content onto the device, based on the manufacturer's description. In many cases, the team of engineers who build the devices are different to the persons who write the descriptions, so there are at least three groups of persons involved and each group of persons has to perform their job correctly in order for the system to work.

Often, the technical specifications generated by each of the groups of persons do not match with each other, which means the system as a whole does not function correctly with the result the content cannot be downloaded or if it can be downloaded, then it cannot be correctly displayed on the target user device.

Generally, adaptation of content is complicated and can only be done by a team of one or more programmers. The programmers have to write programs which examine the device description, and then adapt the content accordingly to match the device. This is not ideal, because one of the reasons which web technology has taken off is that persons without programming skills are able to adapt content and use editor software to create web content.

Referring to FIG. 2 herein there is illustrated schematically in further detail, operation of the prior art system of FIG. 1. Content is adapted to suit a particular user device as follows. User device 200 requests content from a content repository. The request for content includes a pointer to a device information stored on a device profile web server 201 maintained by a device manufacturer. On receiving the content request from the user device 200, content web server 202 requests a device profile from the device profile web server 201 over a communications network (for example the Internet). The device profile web server returns a user device profile to the content web server, and the content web server performs a custom adaptation on a requested item of content, using the device profile, to adapt that content for the particular user device which has requested the content.

It is therefore necessary for the content web server to adapt the layout of the page display, and the type of objects which are displayed to match the target user device.

This approach involves a number of different enterprises or commercial entities in co-operating in order to provide a workable system. For example, it involves a device manufacturer, and a content provider co-operating with each other to exchange technical information concerning the capabilities of a device. Because of the wide variety of user devices, telephone handset manufacturers have created a standard which describes the capabilities of user devices. However, the standard has encountered problems in its implementation. Typically, each individual model of device is provided with a device description. However, the device description does not always accurately represent the technical capabilities of the device.

Referring to FIG. 3 herein, there is illustrated schematically a previous approach of the applicants, described in more detail in published U.S. application No. 03-0167334, the contents of which are hereby incorporated by reference. In that approach, a system of classification of client devices 300 is used. Various client devices are classified according to their various technical attributes to provide a set of device capability class descriptions 301. A content provider computer operates a program 303 to map individual items of content 303 to the capability classes. In doing so, the program refers to a device profile web server 305 to download a device profile describing the technical capabilities of an individual device. The content server determines the most suitable variant of content using the capability class, and provides a map of content to the capability class of which the individual user device is a member. The capability class descriptions are descriptions of what the capabilities of a device need to be for it to display a certain type of content. For example, where there is an image of a certain size and of a certain color depth, the requirements of that image are presented to the server and the server determines whether a device is capable of displaying the content based upon the capability class description of that device.

There is a further component which maps all the different device capability classes onto the content. Since there are potentially hundreds of individual device types, if the persons providing content to a website have to create different content versions for each individual device, this will be a large task. However, if devices are categorized into a number of different classes, each having a class type capability, then content providers can design different content versions for a restricted number of device capability classes. For example, a content provider may create five different versions of content, suitable for presentation in five different device capability classes. Within those capability classes, multiple devices belong to each device capability class, so the content may be provided on a wide variety of devices, if those devices are grouped into classes according to their device capabilities. The content providers don't need to know what the capability of each individual device is, as long as they have the device capability class description. As new devices are developed, provided they fit in with a device capability class description, the content will be automatically displayable on those new devices.

The user device 300 makes a request to the web server 301. The web server requests a device profile, which is a description of the device's capabilities from the device profile web server 305. The content web server 301 inspects the capabilities of the device 300, compares them with the capability class descriptions and based on that, picks the most appropriate variation of the content 304, which is delivered to the user device 300.

There are two possibilities for error in assigning content to a terminal user device using the class capability system. Firstly, the device manufacturers may have made incorrect descriptions of their devices i.e. incorrect device profiles. Secondly, the content providers may have got their class capability descriptions wrong, i.e. incorrect descriptions of their content. However, it is in the interest of both the device manufacturer, and the content provider to give the end user the best possible rendering of content.

However, the above system still relies on the fact that the basic description of the device provided by the device manufacturer is correct, and does not overcome the problem of device manufacturers incorrectly describing the capabilities of their devices.

In general, if there is a problem, then it is common for the device manufacturers and the content providers to consider that the technical problem lies with the other party. The device manufacturers assume that the content providers have made a mistake in their device capability class description, and the content providers assume that the device manufacturers have made a mistake in their device profiles.

A further trend in Internet communications is the creation of the "semantic web." Traditionally, data is stored on individual computer entities, in a form in which the data is "encapsulated" by an applications program. That is, the data is specific to an applications program, and is accessible only by opening an applications program of the same type, or of a different version, for example, an upgrade, of the same applications program. In general, if the data is attempted to be opened by another applications program, a data file will either not open, or if it does open, the data may be effectively unusable.

It is known in XML to store data in a form, which makes it easier for several different applications to access the same data. Typically, several applications programs may access an XML file, on a single computer entity. However, this does not make the data universally accessible to a plurality of computer entities operating a plurality of applications programs.

SUMMARY OF THE INVENTION

According to a first aspect there is provided a method of diagnosing faults in performance of providing content to display devices and displaying the content provided, the method including the step of providing to a plurality of entities sufficient information concerning (a) at least one device and (b) at least one content item, such that each individual entity is able to arbitrate concerning a performance of said device and said content, on the basis of said device information and said content information.

Other aspects of the invention are as recited in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 7 illustrates schematically an example of a capability class for a device, and an example of a mapping between a device capability class and a content item;

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

In this specification the term "capability" or "capabilities", when referring to a device, is intended to be applied broadly, to include within its scope (but not limited to): simple technical attributes, such as, for example a specified screen size of 60×60 pixels; a specified technical attribute in conjunction with one or more conditions which must be met in respect of that attribute, such as for example "screen size 60×60 pixels", and the condition "greater than", meaning that in this example, a client device capability required to manifest an image is a screen size of greater than 60×60 pixels; or combinations of technical attributes, such as the ability to display moving images in combination with the ability to manifest color for example.

Figure 1:
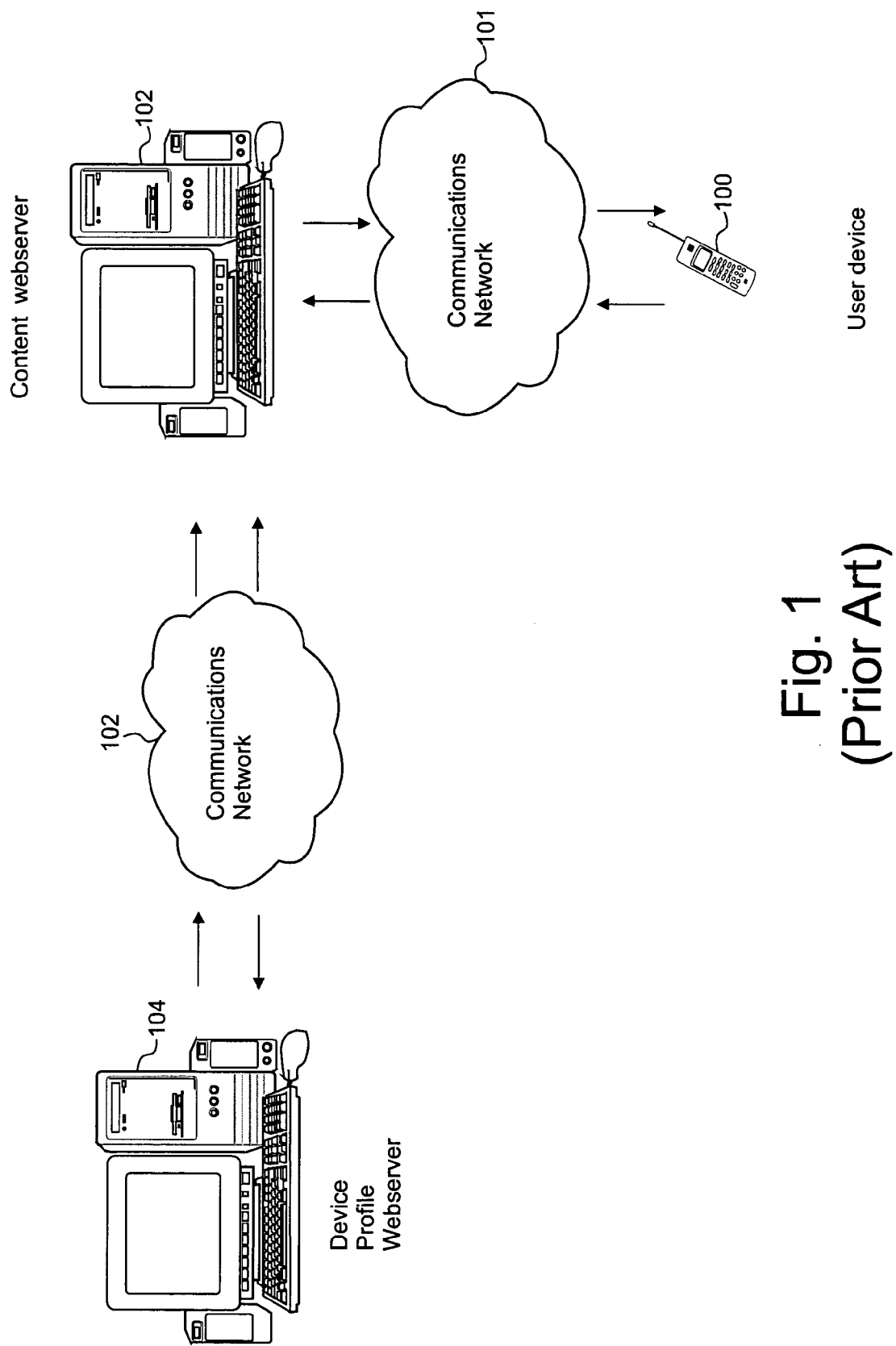
FIG. 1 illustrates schematically a prior art system for matching content with individual client user devices.
Figure 2:
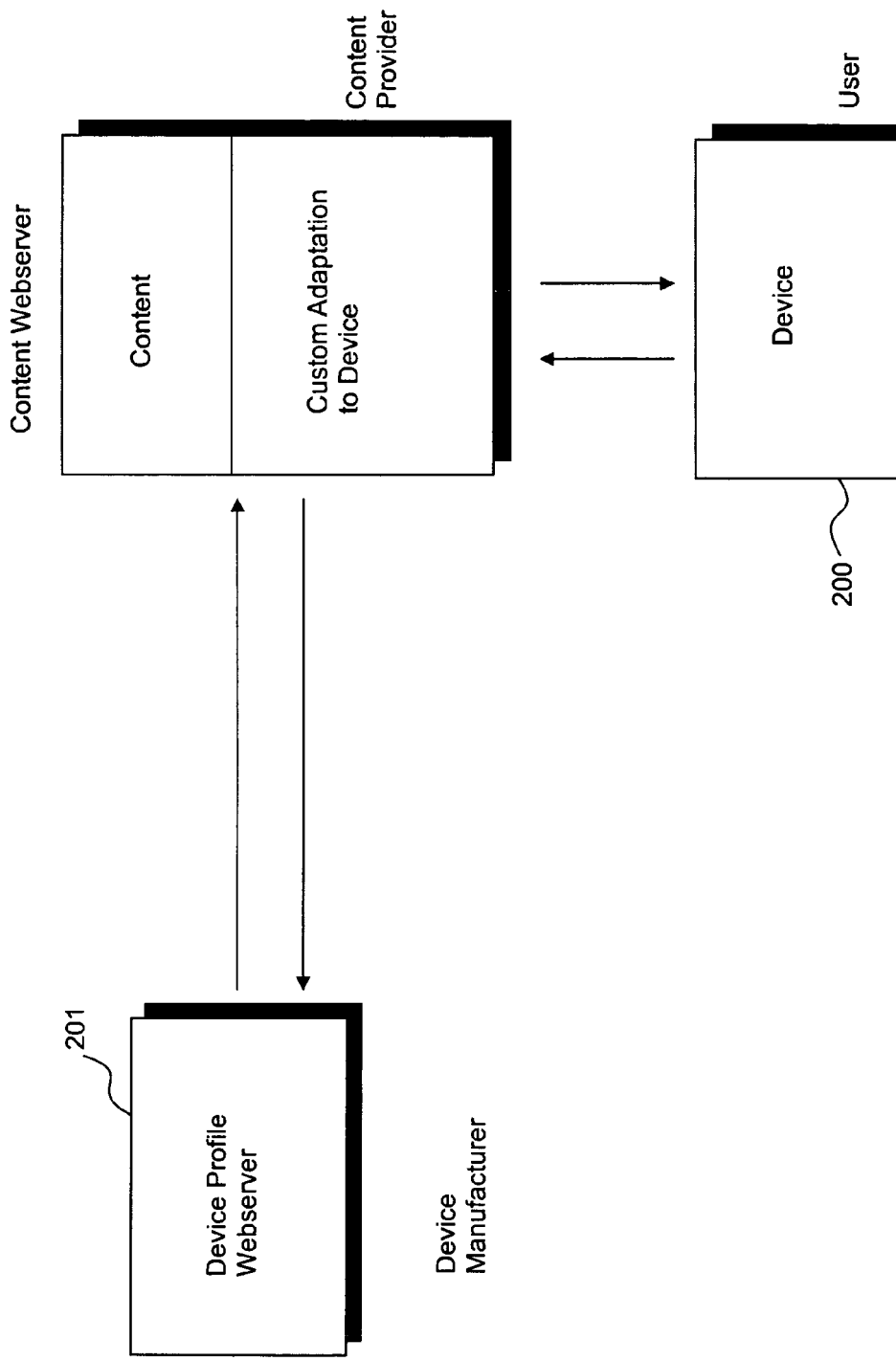
FIG. 2 illustrates schematically how the system of FIG. 1 operates by individually adapting content to individual device profiles of client user devices.
Figure 3:
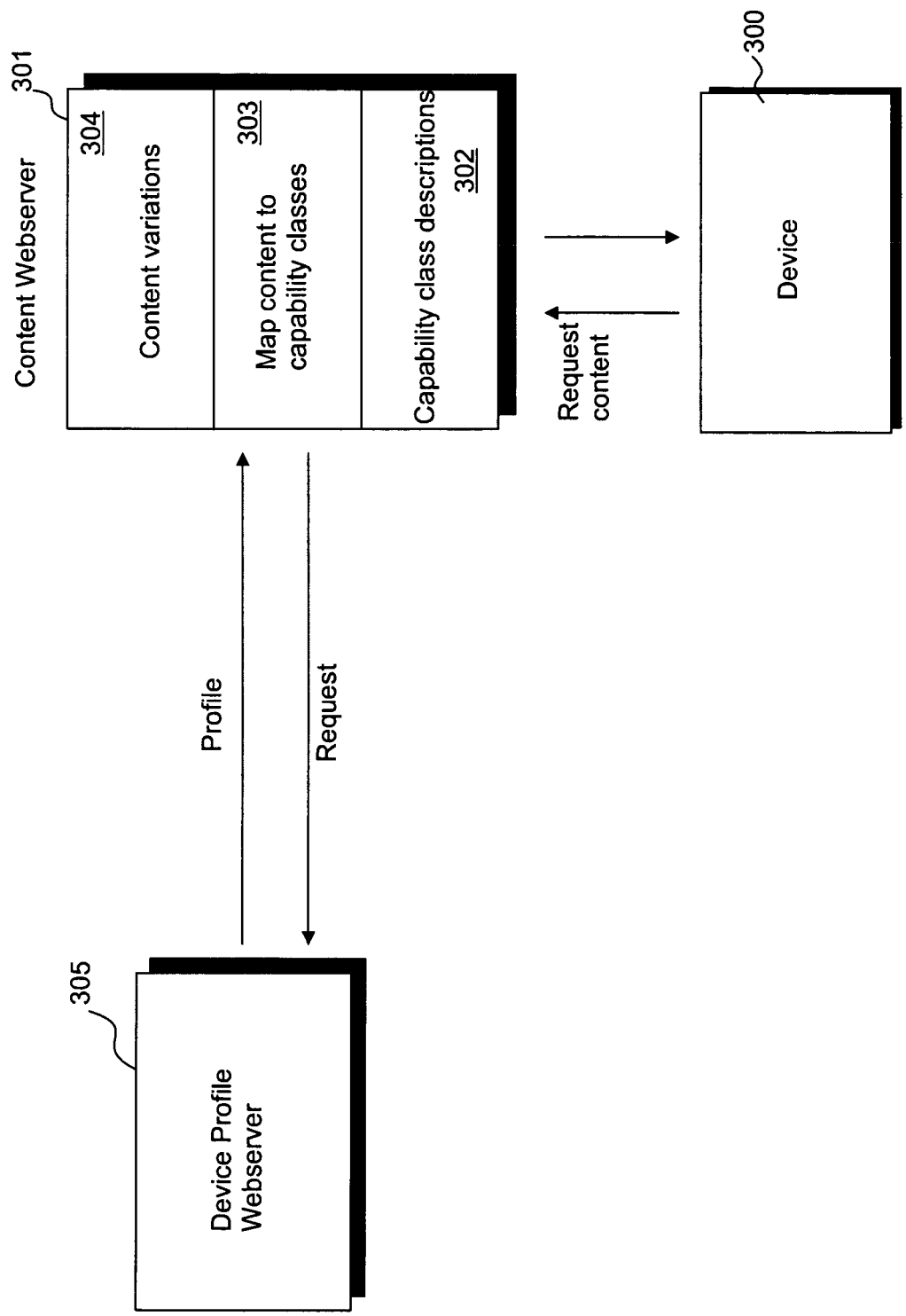
FIG. 3 illustrates schematically a method for mapping content to a plurality of devices by classifying capabilities of the devices in a set of capability class descriptions, and mapping content items to capability classes.
Figure 4:
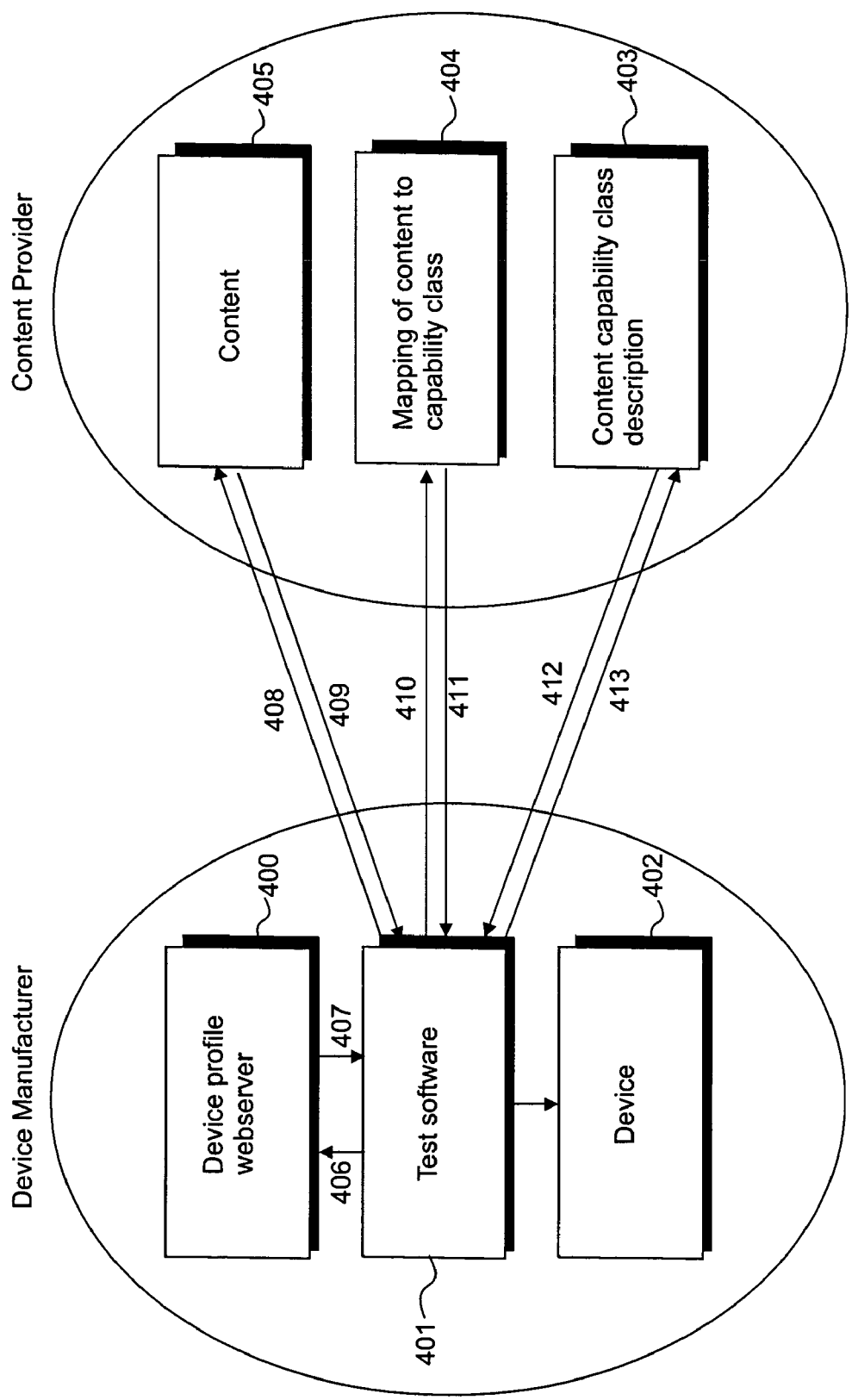
FIG. 4 illustrates schematically a system and method for validating device profiles and capability class descriptions according to a specific embodiment of the present invention.

Referring to FIG. 4 herein, there is illustrated schematically components of a system for validating the correctness of device profiles and device capability class descriptions according to a specific embodiment of the present invention. The system comprises, at the device manufacturer, a device profile web server 400; and a test software module 401 for testing one or more devices 402; and at the content provider, content components 405; a set of device capability class descriptions 403; and a mapping of content to device capability class descriptions 404 which maps individual content components 405 to the capability class descriptions 403.

Operation of the system will now be described.

The device manufacturer makes available a device profile. Additionally, the content is available from a content provider. According to specific embodiments and methods of the present invention, there is also made available component elements of the content, that is, the components from which the content is constructed. Thus items which are made available online by the content provider, to the device manufacturer include:

Basic individual components of the content, from which the content is composed;

Mappings of content components to device capability classes; and

At least one device capability class description of a class of devices.

The test software 401 requests a device profile for a particular device under test in process 406 from the device profile web server 400. The device profile web server delivers the device profile in process 407 to the test software 401. The test software additionally requests content components 405 from the content provider in process 408, and receives those in process 409. The test software requests a mapping of the content components to the corresponding device capability class in process 410, which are delivered by the content provider to the device manufacturer in process 411. The test software of the device manufacturer requests a device capability class description 403 from the content provider in process 412, which it receives in process 413.

By requesting and receiving the above items, the test software is in a position to check that the device 402 can display the content 405.

Figure 5:
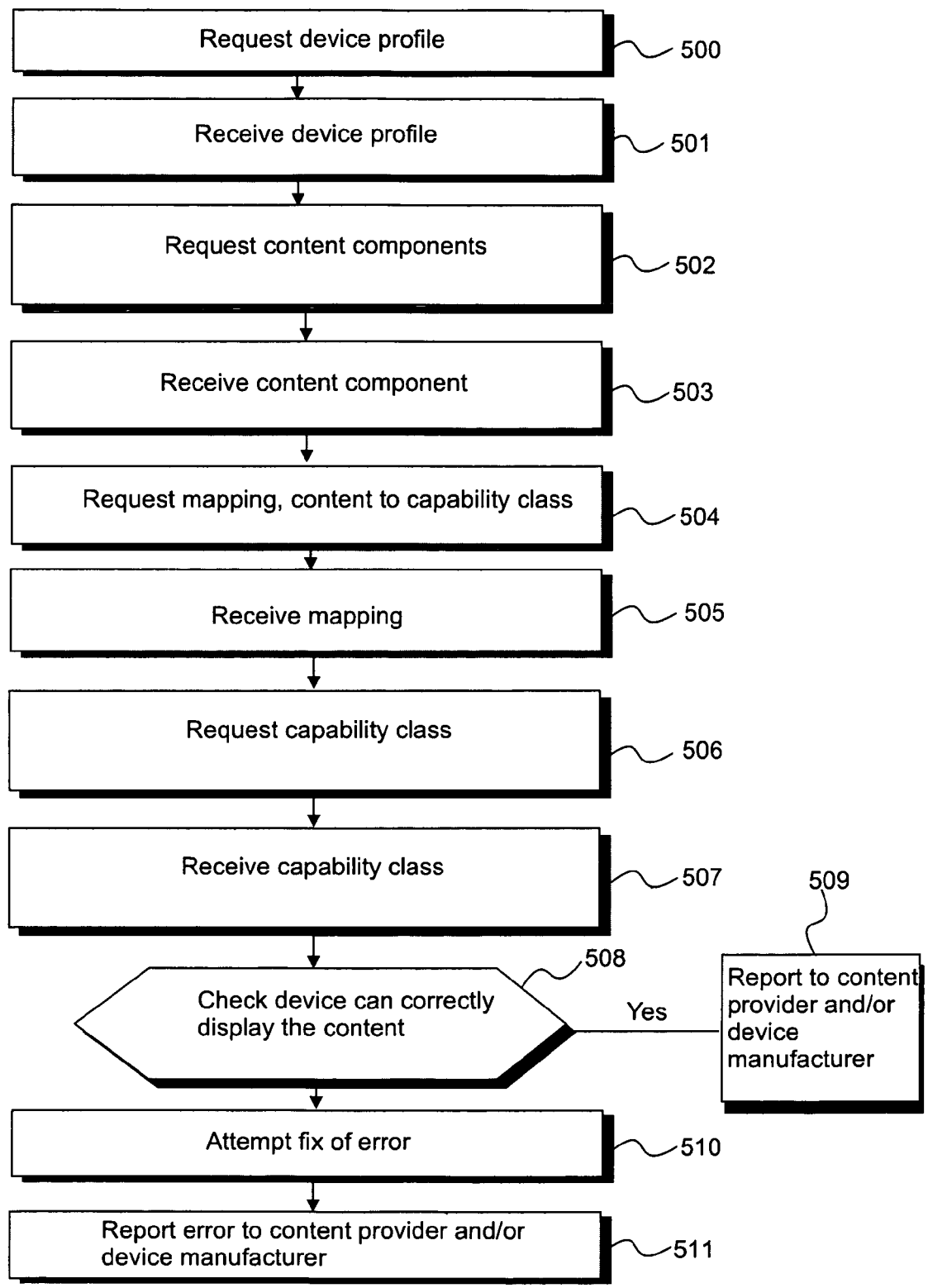
FIG. 5 illustrates schematically aspects of operation of a test component comprising the system of FIG. 4 herein, as operated at a device manufacturer.

Referring to FIG. 5 herein, there is illustrated schematically overall operation of the test software at the device manufacturer. In processes 500 to 507, the software requests the device profile, content components, mapping of the content to the device capability class, and the device capability class itself and receives that information from the device profile web server and the content provider computer. In process 508, the software tests the device, or a simulation program, providing an emulation of the device, to check that the device can display the content received from the content provider computer. During the process 508 of checking that the device can correctly display the content, this may entail an engineer visually inspecting the device as it displays content, and checking for any problems with content display, such as blank pages, mis-alignment of content, coloration problems or the like. If the result of the test is successful, then the test software reports back to the device manufacturer and/or the content provider computer in process 509. Otherwise, if the test is unsuccessful, the test software attempts to fix the error in process 510 and reports back to the device manufacturer and/or the content provider either that the error has been successfully fixed, or that the error persists.

The reporting of the error is broken down into a report that the error either resides with the device profile, or with the device capability class description, and therefore the error is either attributable to the device manufacturer, or to the content provider. This enables the device manufacturer to obtain an independent analysis carried out by the test software, which may be provided by an independent third party, that the error is with the device manufacturer itself, or (as the case may be) with the content provider. Similarly, where the error rests with the content provider, the content provider can have confidence that the error test report, which attributes the error to the device capability class description generated by the content provider is objective and independent, and is not merely the device manufacturer blaming the content provider for technical faults.

Figure 6:
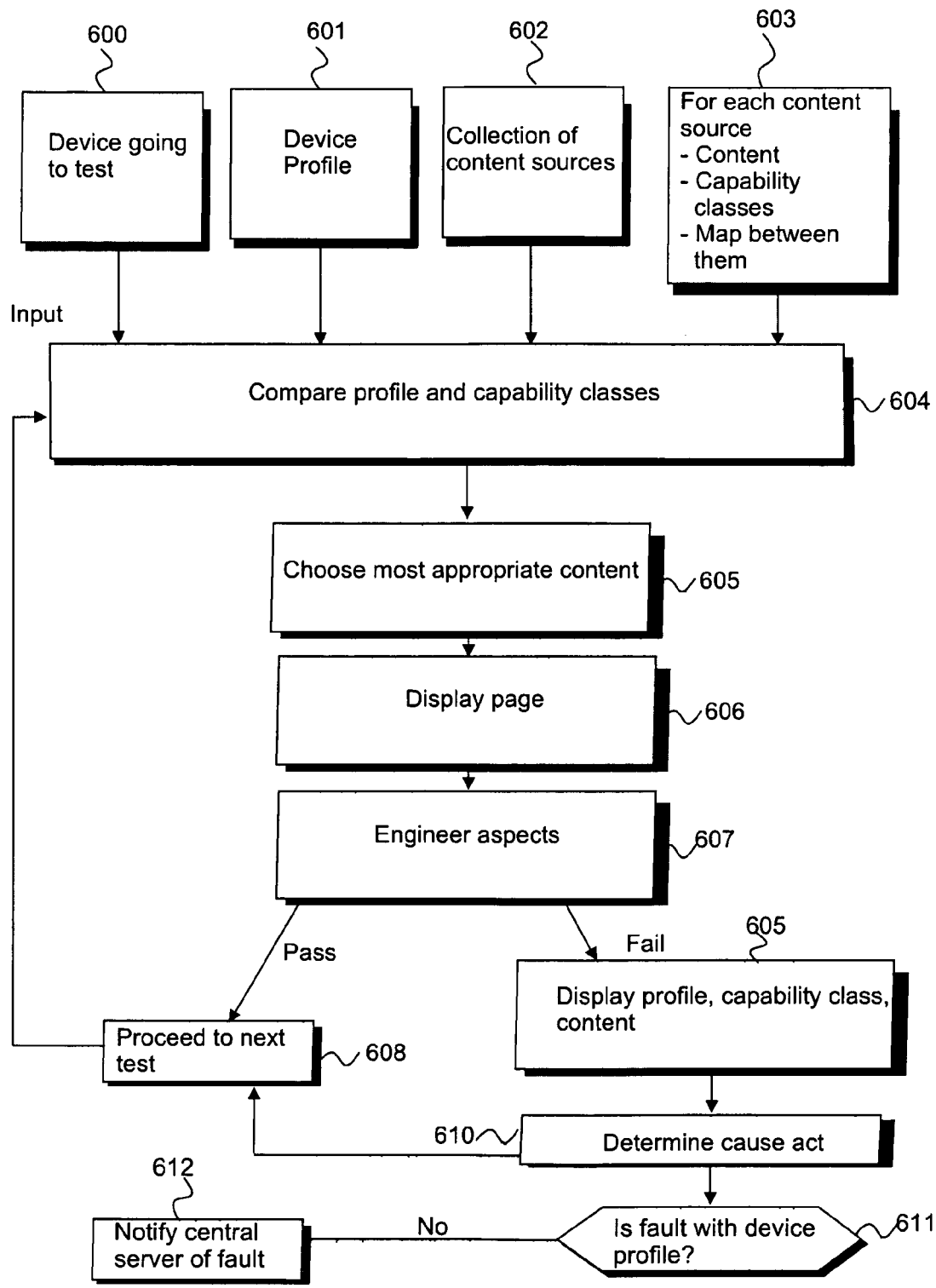
FIG. 6 illustrates schematically further processes operated by a test component hosted by a computer entity of a device manufacturer.

Referring to FIG. 6 herein, there is illustrated schematically processes carried out by the test software operating at a device manufacturer. The test software has four sources of input: data 600 describing the actual device to be tested; data 601 describing the device (the device profile); data 602 describing a collection of content sources; data 603 describing for each content source its content components, device capability classes, and a mapping between the content components and the device capability classes. The test software goes through the process of displaying a page ready for the device, by comparing the profile and device capability classes in process 604, choosing the most appropriate variant of content 605 and displaying a page display in process 606. In process 607, a human engineer inspects the display page and either passes the page display in which case, the software proceeds to the next test in process 608, or fails the display page in which case the software displays the profile, device capability class and content in process 607 and determines the cause of the display failure and acts accordingly in process 610. The software can report the fault to a central server, which relays details of the fault to the content provider.

In process 609, under conditions of failure to display a page correctly, an engineer is provided with information which identifies the cause of the fault. The software displays the device profile, the device capability class which describes the requirements of the content, and the content itself, thereby enabling the engineer to see exactly why the content display has failed. By inspecting the information, the engineer can tell whether the fault lies with the profile, the device capability class, the content, or with the device itself. The engineer is then able to make a decision on where the fault lies and act accordingly. For example, if the engineer determines that the fault lies with either the device or the profile, and therefore the device manufacturer has control over the origin of the fault, the engineer can set in motion corrective action. However, if the device engineer determines that the fault lies in the device capability class or in the content, then the engineer can contact the content provider via an intermediate central server device.

Referring to FIG. 7 herein, there is illustrated schematically an example of a capability class for a device. Within the device capability class, several features are grouped together in order to define a class of devices having similar parameters within the class. In the example shown in FIG. 7, devices which have all the following attributes are grouped together:

display width greater than 90;
    display height greater than 90;
    display width less than 200;
    display height less than 320; and
    display color depth greater than 8

If a device has all these attributes, then a "medium smart phone color" is used.

A mapping from a class to a content may be as shown in FIG. 7 that if a medium smart phone color is specified in the device capability class, then use a particular image, e.g. Beckham 03.JPG can be used and displayed on the device. This maps the content component (the image Beckham 03.JPG) onto a class of devices having display capabilities specified in that class description.

Sets of individual devices are grouped together in device capability classes. There is provided a set of mappings between a device capability class, and a component of content. The content is broken up into a set of content components with high granularity, with there being a set of mappings between the content components and the device capability class descriptions.

Figure 8:
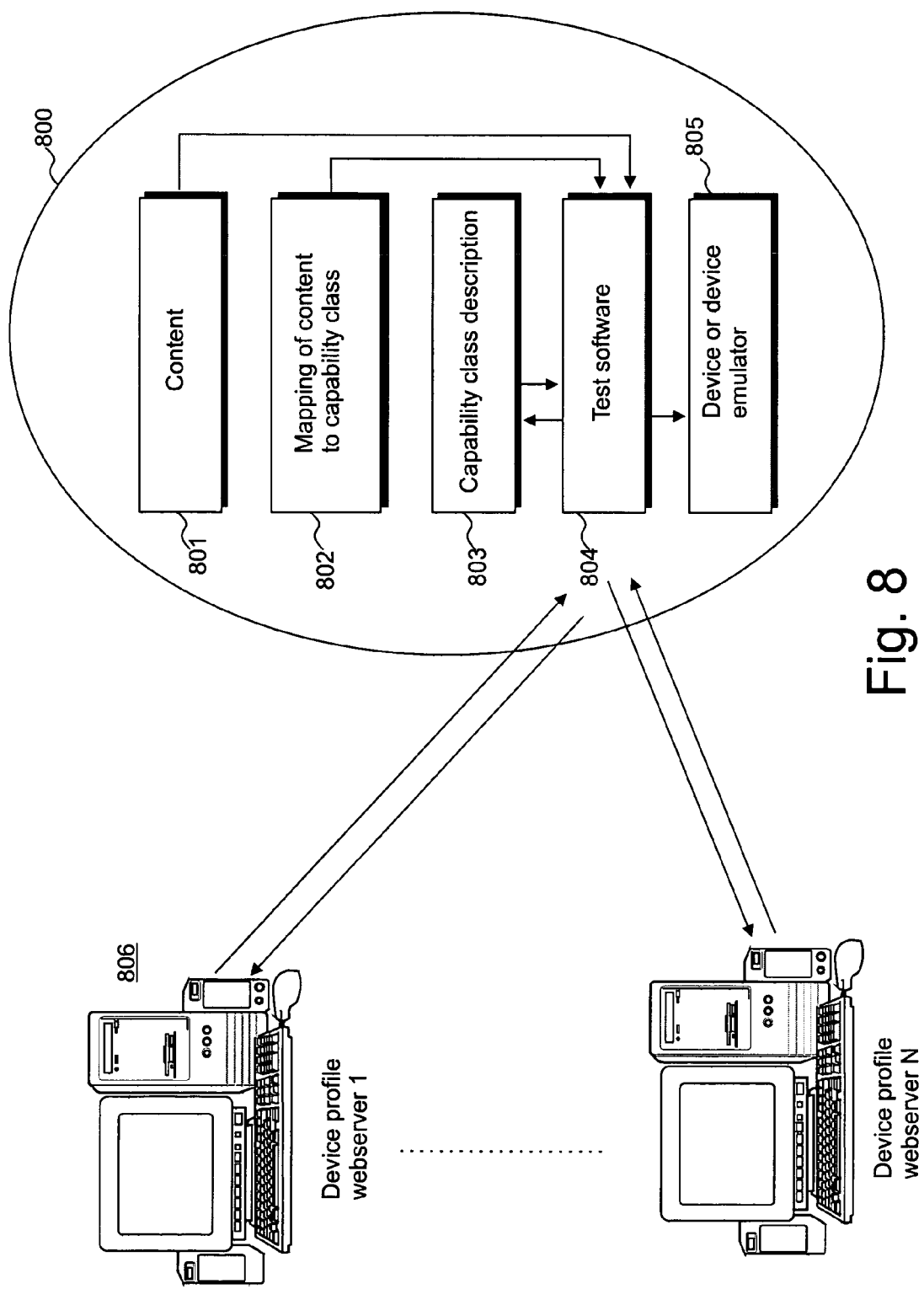
FIG. 8 illustrates schematically operation of a test component hosted by a content provider.

Referring to FIG. 8 herein, there is illustrated schematically operation of the test software from the point of view of a content provider 800. The content provider has content 801; a mapping 802 of the content to a set of device capability classes; a set of device capability class descriptions 803; the test software 804; and one or more user devices to be tested, or equivalent device emulators. A device manufacturer has a device profile web server 806 storing one or more device profiles.

Test software 802 sends out requests for content, mapping of content to device capability classes, and device capability class descriptions. Additionally, the test software requests device profiles from a device profile web server 806 at the device manufacturer and receives those device profiles. The test software checks that the device can correctly display the content and report back to the content provider and/or the device manufacturer on the success of the test on the device.

Figure 9:
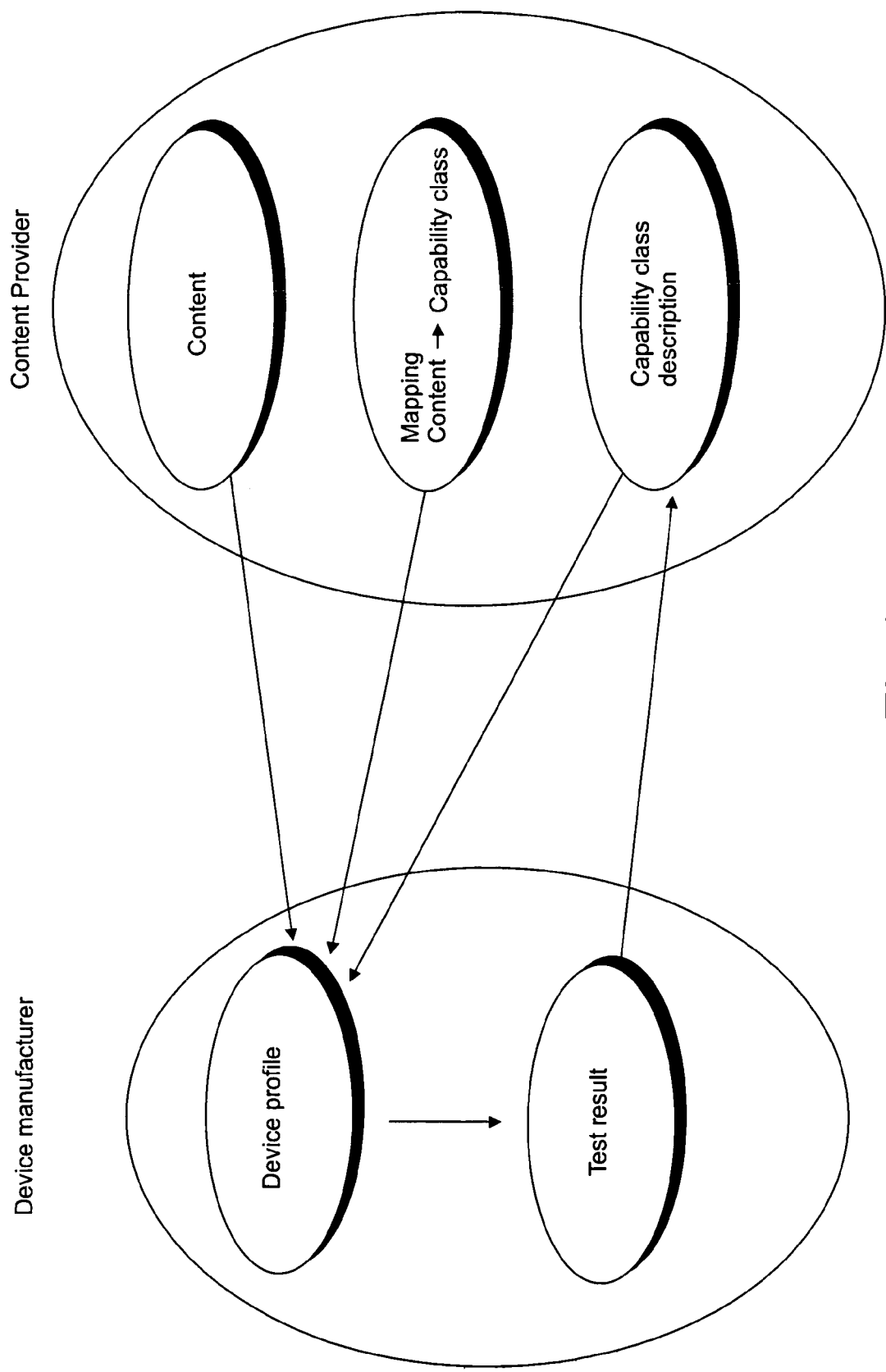
FIG. 9 illustrates schematically an information flow according to a method of operation of the system of FIGS. 4 to 8 herein.

Referring to FIG. 9 herein, there is illustrated schematically an information flow in one method of operation of the test system described with reference to FIGS. 4 to 8 herein. In general, a device profile, detailing the new features and specification of a new device will be kept confidential by the device manufacturer who will be reluctant to release that device profile to content providers. Premature release of device specifications may give the device manufacturer's competitors advance warning of new products which are being introduced which may deny the originating device manufacturer the benefit of being first to market with a device. Consequently, device manufacturers are reluctant to send out device profiles until devices are completed. However, then remains the problem that once released, those devices must be able to properly display content. Using the system described herein, device manufacturer's can test the devices, and allow the content providers (who may also be network operators) to have confidence that the device will work with the content once the device is marketed. The device manufacturer receives details of the content, the mapping of the content to the device capability class description, and the device capability class description from the content provider. The device manufacturer can then apply these items with the device profile to the test software and test the device in order to obtain a test result.

The test result will either show that the device has problems in displaying the content or that the content is properly displayed. Where the test result is positive, and the device passes the test, this information can be fed back to the content provider without the device manufacturer needing to disclose details of the device profile (i.e. the device specification). The content provider will have confidence that once the devices are introduced to the market, they will work with the content which the content provider has supplied to the device manufacturer for testing.

Where the device fails the test, the content manufacturer obtains the information of whether the fault lies with the device profile, or with the content. If the fault lies with the device profile, the device manufacturer can amend the device profile or the device itself, to make sure that the device properly displays the content and then re-run the test on the amended device profile and device to obtain a positive test result which is reported to the content provider. Alternatively, if the fault lies with the content supplied by the content provider, the device manufacturer can report this back to the content provider, and the content provider will have confidence that the content needs to be amended to fit into the device capability class description which they have supplied.

In all cases, the device can be introduced to the market in a manner which has been pre-tested to display the content, without the content provider needing to have advance details of the device profile before launch of the product onto the market.

The test software may operate to perform a block testing of a device for a set of different content pages. The software puts together a list of websites to test onto a device, to constitute a particular type of test for a new device. In general, network operators are organized as different operating companies in different countries, operating under different brand names. Therefore, an operator may specify a set of different branded websites which they require the content to operate with. The network operator may write down a list describing all the different websites in the different countries for which the device is to operate with. The test software automatically builds a set of tests to test the device (or a device emulator where the device is unavailable), for all the different branded web sites. The device manufacturer then tests all the different content layouts on the different websites will display correctly on the device or device emulator.

This compares with the prior art situation in which a person at the network operator would have to compile a set of different tests and apply each test to each individual device. However, using the system described herein, a set of devices can be described by means of a device capability class description, and a network operator can provide a list of websites (defining the content) and a mapping of the content to the device capability class and a single series of tests of the multiple websites can be carried out on a test device operating in accordance with the device capability class description. In the system described herein, the set of tests is described once and the test software automatically builds that set of tests for all devices in a class, which saves the operator time.

Referring again to FIG. 6 herein, as opposed to testing many different types of content, a content provider may wish to test just one particular page or one particular website. The content provider therefore wishes to test the content against a variety of different devices, these being a set of devices which the content provider wishes to support. For example, mobile phone operator companies generally pick a certain set of handsets, and then make sure that their content is displayable on those handsets. As the market for mobile phone handsets becomes saturated, persons may change their handsets less regularly and therefore a body of legacy mobile phone handsets may persist in the market place over a period of one or two years. A content provider may pick a number of handsets at random, say one hundred handset devices and check whether the content works on all of those handsets, or if not, how many of those handsets the content can be displayed on.

The content can be tested against an actual device itself, or a software emulator of a device operating on a personal computer. It is preferable to use the device itself, since sometimes the emulator may have idiosyncracies within it, which means that it does not correctly emulate the device.

Figure 10:
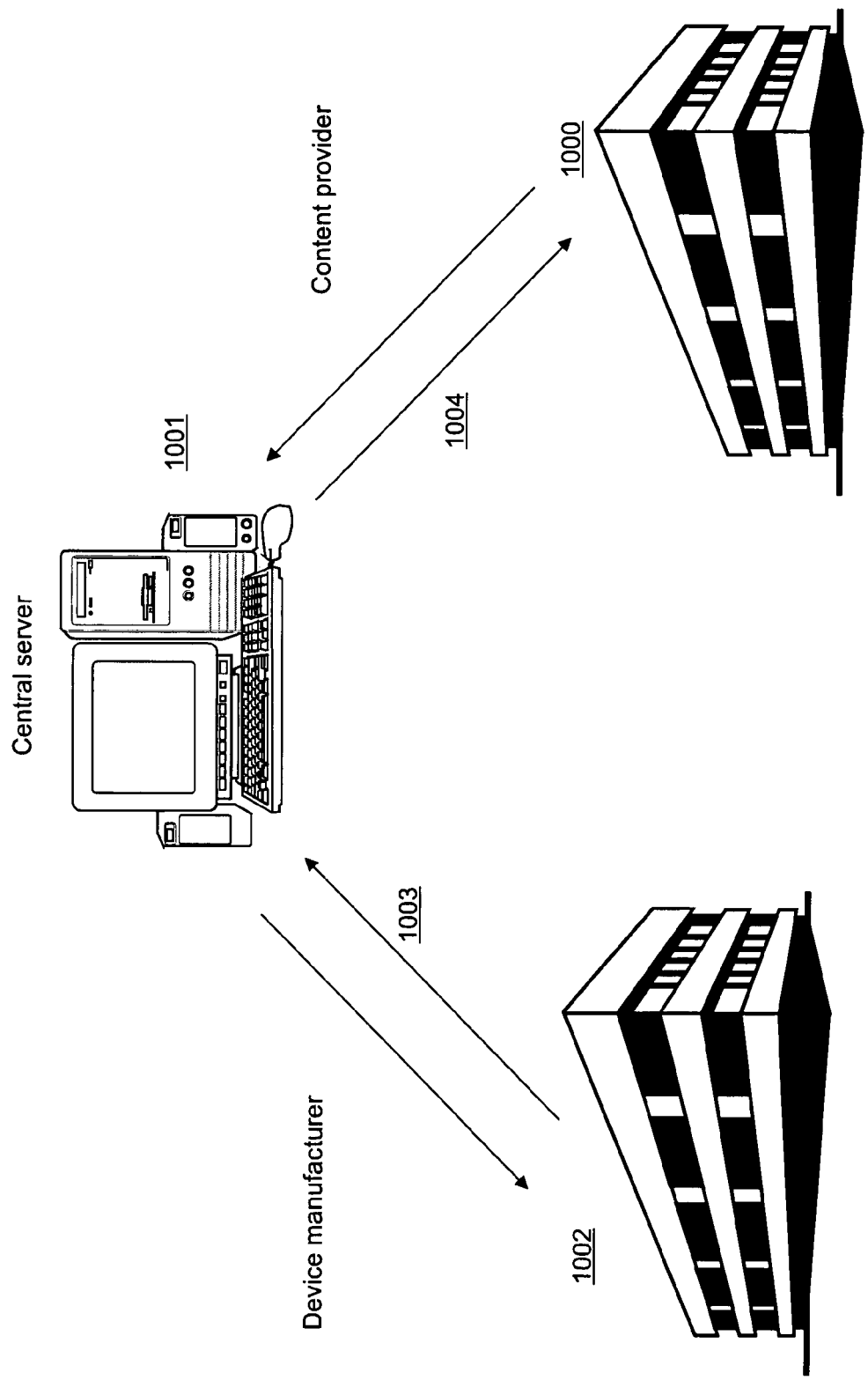
FIG. 10 illustrates schematically communication between a device manufacturer and a content provider via a central server device comprising the system of FIGS. 4 to 9 herein.

Referring to FIG. 10 herein, there is illustrated schematically communication between a device manufacturer and a content provider via a central server device comprising the system.

The device manufacturers make the device profile information available on the Internet, to anyone who is interested. However, the device manufacturers do not necessarily wish to make available the contact details of the individuals involved in designed the device available to anyone over the Internet.

Typically, within a large organization, persons responsible for a device specification at the device manufacturer may not know who is responsible for writing the device profile. Within large organizations, spamming and unsolicited e-mails are a large problem. Publication of e-mail addresses of design team members for a product can lead to clogging up of e-mail addresses through unsolicited e-mails. Similarly, for individuals at the content provider, making available e-mail address publicly can lead to a large volume of unsolicited e-mails.

Individuals at the device manufacturer correspond with individuals at the content provider using the central server for the following reasons:

The central server enables identification of the correct person within the device manufacturer organization to contact concerning the device profile.

Where there are a team of persons involved in producing a device and/or profile, the central server stores a list of individuals, together with their responsibilities for the device, and their contact details.

The central server allows contact details of individual persons in the device manufacturer to be made available to individual persons and their content provider without directly making available those details over the Internet.

Using the system described herein, content providers may make available their device capability class descriptions over the internet to anybody. Therefore, new manufacturers may look at the device capability class descriptions published by the content provider, and gain an overview of developments in content and capabilities which are required, and use that information in their own internal product development for new devices.

Content provider 1000 makes available publicly device capability class descriptions. Central server 1001 makes available to the content provider 1000 and to individuals within the device manufacturer 1002 the identities of persons responsible for information within either organization, and also allows persons within either organization to contact persons in the other organization, without making the details of those persons available publicly on the internet. The central server 1001 may ensure that enquiries and messages are forwarded to the correct person at the device manufacturer.

Referring again to FIG. 10 herein, where the device manufacturer identifies a problem with the content, device manufacturer 1002 sends a message 1003 to the central server describing the device capability class description and the content. The central server identifies the appropriate correct person to contact at the content provider and relays the message to that person.

The central server may be operated by a trusted third party, or an industry organization, for example, the Open Mobile Alliance, or by private companies who provide resources to the industry independently. Alternatively, the central server could be operated by a network operator, or via device manufacturer.

Using the system as described herein, a device manufacturer and a content provider may be enabled to work more closely with each other to achieve a common goal in a more efficient manner than has been carried out previously.

Specific embodiments according to the present invention may be compatible with semantic web operation. By "semantic web" it is meant a community of computer entities capable of communicating with each other, in which data may be stored in a format which is independent of an individual application program type, and/or is common to a plurality of different applications of different types. For example, a text file may contain texted data which is stored on a server computer, the texted data being made available to a plurality of computer entities in which each computer entity has a different word processing applications program, and yet the text file may be commonly importable to each said word processing application program.

A problem with the semantic web approach is that, because it involves two or more enterprises co-operating, those two enterprises need to work together to make the semantic web system work. However, invariably there will be technical problems, and it is natural for each separate enterprise to attribute technical faults to other enterprises with whom they are communicating, rather than attribute the faults to themselves. Additionally, where each enterprise has each incomplete information, then there will be a presumption that another enterprise with whom they are communicating has made a fault, since each individual enterprise does not have enough information to establish, in all cases, where a technical fault may lie.

Specific embodiments disclosed herein may provide an arbitration service, through which the device manufacturers and the content providers can each determine whether they have made mistakes in describing their device profiles, or their capability class descriptions respectively.

In the specific embodiments disclosed herein, each party may be provided with detailed information about a technical problem, and the same or commonly shared information may be available to each party, thereby allowing the parties to arbitrate and to objectively identify the source of a technical fault.

The invention claimed is:

1. A method of diagnosing faults in performance of providing content to display devices and displaying the content provided, the method comprising:

providing to a plurality of entities sufficient information concerning (a) at least one device and (b) at least one content item, such that each individual entity is able to arbitrate concerning a performance of said device and said content, on the basis of device information comprising at least one device profile describing content delivery capabilities of said at least one device and content information comprising at least one capability class description, which describes capabilities of a class of devices for displaying a particular content version; and mapping said content item based on said capability class description to obtain mapped content, wherein the arbitration comprises testing that the device may correctly display the mapped content.

2. A process for enabling enterprises to work together to establish systems which operate correctly wherein components of the system use a semantic web for negotiating capabilities, said process comprising:
- receiving at least one content item;
- receiving a capability class description describing capabilities of a class of devices for displaying a particular content version;
- receiving a mapping of the content to the device capability class;
- applying said mapping to said content, to determine whether said mapping correctly maps said content to said capability class descriptions;
- testing said mapped content against a device to determine whether said device may correctly display said mapped content;
- and generating a message depending upon a result of said test.

3. The process as claimed in claim 2, further comprising:
depending upon a result of said test;
generating a message indicating that said mapped content has failed to display on said device.

4. The method as claimed in claim 2, further comprising:
generating a diagnostic message describing whether a fault is attributable to at least one of the following:
- a fault in a mapping of said content to a said device capability class;
- a fault in a device capability class description;
- a fault in a devices conformity to said device capability class description.

5. A system for enabling enterprises to work together for establishing systems which operate correctly, wherein components of said system are operable for negotiating capabilities of said system using a semantic web structure, said system comprising:
- at least one openly available capability class description which describes capabilities of a class of devices for displaying a particular content version; and
- a test component capable of testing whether a mapped content item may be correctly displayed on a device, and whether said device conforms with said device capability class description.

6. The system as claimed in claim 5, wherein said test component comprises a test program operable by a device manufacturer.

7. The system as claimed in claim 5, wherein said test component comprises a test program operable by a content provider enterprise.

8. A test method for testing that content is displayable by at least one device, said method comprising:
- establishing a device capability description describing capabilities of a device class for displaying a particular content version, of which said device is a member;
- establishing a mapping of said content to said capability class description;
- mapping said content to said device capability using said mapping data; and
- testing said device to determine whether said mapped content may be correctly displayed on said device and to establish that said device conforms to said capability class description; and
- generating a message depending upon a result of said test.

9. The method as claimed in claim 8, comprising:
testing said mapped content on a device of a type falling within said capability class description.

10. The method as claimed in claim 8, comprising:
testing said mapped content on a device emulator of a type falling within said capability class description.

11. The method as claimed in claim 8, wherein:
if, as a result of said testing, said mapped content may not be correctly displayed on said device, a fault report is generated.

12. The method as claimed in claim 8, wherein:
if, as a result of said testing, said mapped content may not be correctly displayed on said device may not be correctly displayed on said device, a fault report is generated; and
said fault report is made available to a community of enterprises over a communication network.

13. The method as claimed in claim 8, wherein said mapping data is made available to a community of enterprises over a communications network.

14. The method as claimed in claim 8, wherein said capability class description is made available to a community of enterprises, over a communications network.

15. A test method for verifying whether a content item is correctly displayable on a device, said method comprising;
- providing a device capability class description describing a set of capabilities for displaying a particular content version of a class of devices to which a said device is designed to belong to;
- providing a mapping of a content item to said device capability class description;
- testing whether said mapped content displays correctly on a device emulator; and generating a message depending upon a result of said test.

16. A system for enabling design of display devices to display content items, said system comprising:
- at least one device profile server computer entity, said device profile server capable of supplying a capability class description describing capabilities of a class of devices for displaying a particular content version;
- at least one content provider server computer entity capable of serving at least one content item for display on a said display device; and
- at least one test component, said test component operable for:
- mapping said content to a said capability class description using a said mapping data; and
- testing said mapped content on a test device to determine whether said mapped content may be correctly displayed on said display device; and
- wherein said test component is operable for generating a test result message depending upon a result of said test.

17. The system as claimed in claim 16, wherein said test component comprises a device emulator application.

18. The system as claimed in claim 16 wherein said test component is operable for generating a test result message indicating whether said mapped content correctly displays on said test device or not.

19. The method as claimed in claim 16, wherein said content item comprises a plurality of content components; and
said mapping data comprises, for each said content component, a mapping between said content component and a description of a capability of class devices comprising at least one device.

20. A computer readable medium containing program instructions for controlling a computer entity for verifying that a content item can be correctly displayed on a display device, said computer readable medium, when executed on a computer, performing instructions for:

receiving a capability class description describing capabilities of a class of devices for displaying a particular content version;

receiving a said content component;

receiving a mapping data for mapping said content item to a device within said capability class description;

mapping said content to said capability class using said mapping data;

displaying said mapped content on said test device; and determining whether or not said mapped content displays correctly on said test device.

21. The computer readable medium as claimed in claim 20, further performing instructions for:

generating a fault report describing a fault in displaying content on said test device.

22. The computer readable medium instructions as claimed in claim 20, further performing instructions for:

communicating a fault report describing a fault in displaying said content on said test device, to a server computer entity.

23. A method of providing content to a target device in a network from a content server, comprising the steps of:

establishing, from data provided by the target device, its capabilities in manifesting the content to a user;

mapping the target device's capabilities for displaying a particular content version to a particular class of a plurality of classes of capabilities;

selecting, from a plurality of versions of the content which are indexed by capability class, a version of the content capable of being displayed by a device of the particular capability class;

establishing, if the target device is unable to display the content, whether this is as a result of: an incorrect representation of the target device's capabilities, an incorrect mapping of the target device's capabilities to the particular capability class, or the content in the selected version of the content not being capable of display by a device having capabilities in the particular class; and generating a message depending upon the result of said establishing.

* * * * *